Aug. 26, 1930.  A. SCHNEIDER  1,774,242

SPLASH GUARD FOR VEHICLE WHEELS

Filed July 20, 1928

INVENTOR

Arno Schneider

Patented Aug. 26, 1930

1,774,242

UNITED STATES PATENT OFFICE

ARNO SCHNEIDER, OF DOBELN, GERMANY

SPLASH GUARD FOR VEHICLE WHEELS

Application filed July 20, 1928, Serial No. 294,121, and in Germany August 13, 1927.

This invention relates to a splash guard for vehicle wheels and of the kind comprising flat deflectable brushes supported at the side of the wheel near the ground and controlled by springs allowing them to yield to obstructions.

The main object of the invention is to provide means for protecting the brushes from damage on bumpy roads, and the invention consists in this respect in connecting the brushes pivotally to a casing which is supported on and adapted to be deflected about the wheel hub and which is connected to the vehicle body so as to be deflected by the latter for raising the front brush from its normal position whenever the wheel receives an upright thrust.

Figure 1:
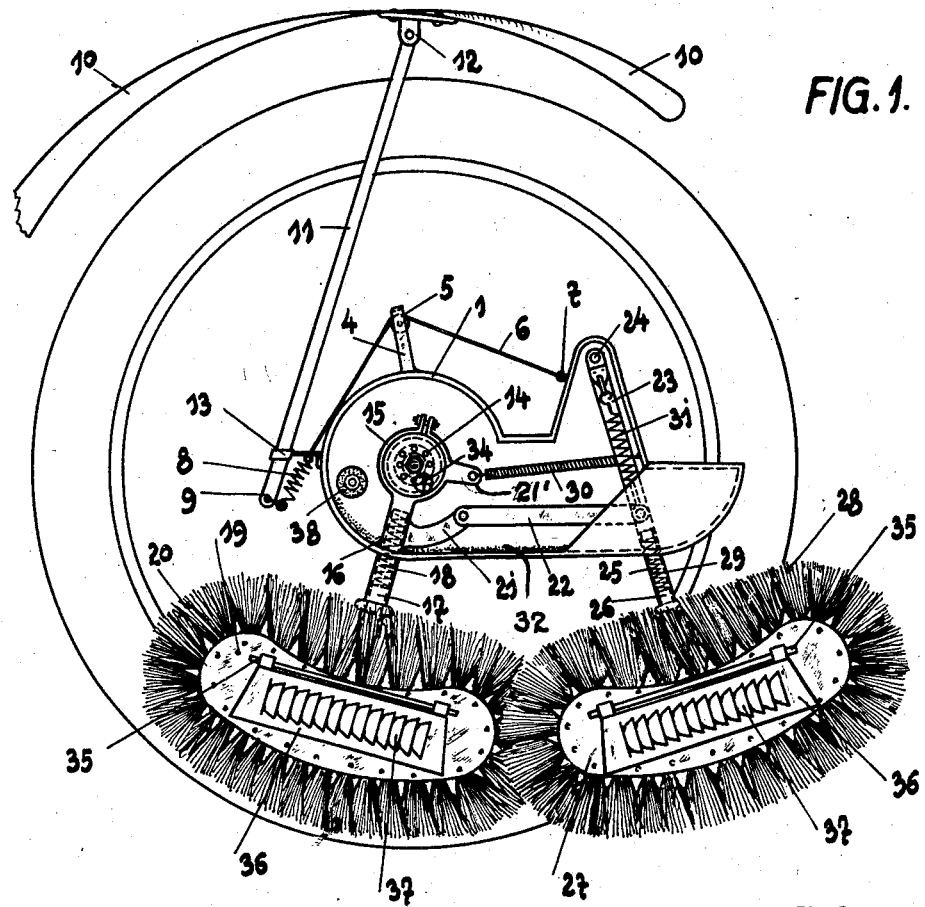
Figure 2:
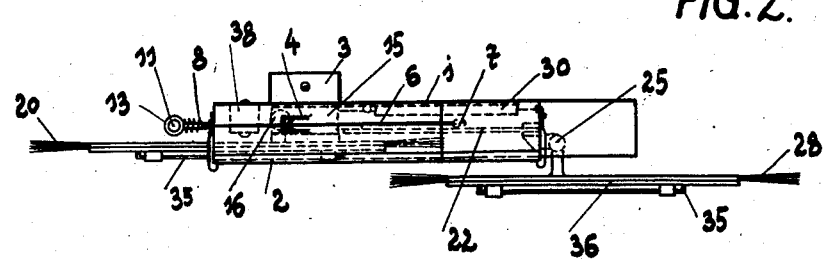
Figure 3:
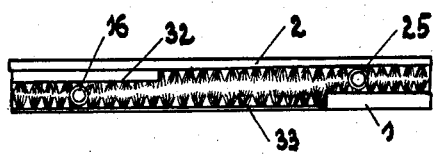

Fig. 1 of the accompanying drawings represents a side view of the device with the casing cover removed, Fig. 2, a top view of the device, and Fig. 3, a bottom view of the casing.

The preferred form of the device comprises a flat, elongated casing 1 which carries at one end, by means of a ball-bearing 14, a revolvable, projecting boss 3. The casing is mounted by means of the boss 3 on the hub of the vehicle wheel and is maintained in a horizontal position by means of a stay 11 one end of which is pivoted to a bracket 12 on the mud-guard 10 while the other end 9 is loosely guided in an eyelet 13 on the casing and connected to the latter through the medium of a spring 8 and a cord 6. The cord, which is supported by a deflecting roller 5 mounted in an arm 4 on the casing, is secured at 7 to the free end portion of the casing while the guide eyelet 13 is situated at the opposite side of the boss 3. The effect of this arrangement is that the casing will be rocked on the hub when the spring-supported body of the vehicle is displaced relative to the wheel.

The actual splash guard is composed of two flat brushes 20 and 28 made up of kidney-shaped plates 19 and 27 to the edges of which radially arranged bristles are attached. The brush 20 is secured to a holder in the form of an arm 17 which telescopes within a sleeve 16 and which is controlled in the latter by a spring 18. The sleeve 16 carries a ring 15 whereby it is rotatably mounted on the ball-bearing element so as to be capable of deflection in a plane parallel to the wheel. The brush 28 is connected to an arm 26 which telescopes in the same manner within a sleeve 25 and which is controlled by a spring 29. The sleeve 25 is pivoted to one end of a bar 23 the opposite end of which is pivoted at 24 to the free, forwardly directed end portion of the casing. A spring 31 maintains the sleeve 25 normally in alignment with the bar 23, and the latter is connected by a link 22 to an arm 21 on the sleeve 16 so that rocking movement will be imparted from one brush holder to the other on contact with obstructions. A spring 30 connected at one end to the casing and at the other end to an arm 21' on the ring 15 holds both brushes normally in their forward end position, and the rearward deflection is limited by a rubber buffer 38 arranged as a stop for the sleeve 16.

The lower side of the casing is slotted or open to admit the brush holders which maintain the brushes at the side of the wheel rim near the ground, in different planes and parallel to the wheel. The slotted or open side of the casing is protected by brushes 32 and 33 which bear against the brush holders, as shown in Fig. 3, and prevent mud from entering the casing. The outer side of the casing is closed by a cover 2 which can be removed for cleaning and for lubrication. The ball-bearing 14 is lubricated by means of a grease-cup 34.

The brushes intercept the side splash produced by the wheel and yield resiliently in opposition to the springs 18, 29, 30 and 31 on contact with obstructions. If the wheel enters a depression in the road-way, the ensuing downward displacement of the sprung vehicle body, including the mud-guard 10, relative to the wheel, will be transmitted by the stay 11 to the casing 1 the forward end of which will be raised together with the brush 28 so that the latter can clear the ridge at the opposite side of the depression.

The efficiency of the device may be increased by the provision on the brush plates of flaps 36 which are hingedly arranged on horizontal rods 35 and formed with gills 37 adapted to raise the flaps about the hinges under the influence of the water-pressure when the wheel passes through a puddle.

In mounting the device on the front wheels, care must be taken that the stays 11 are spaced sufficiently from the wheels to enable the latter to be deflected for steering.

Instead of supporting the casing 1 on the wheel hub, a supporting shackle may be provided which embraces the wheel and is secured behind the latter to the wheel axle.

I claim:

1. A splash guard for the wheels of a vehicle having sprung bodies, comprising a flat, elongated casing, a boss carried rotatably at one end of the casing and adapted to support the latter on the hub of the vehicle wheel, a strut pivoted to the vehicle body and connected resiliently to the casing so as to maintain the latter normally in a horizontal, forwardly-projecting position and so as to raise the front end of the casing on the wheel being upwardly displaced relative to the vehicle body, a pair of telescopic, axially compressible, spring-controlled arms pivoted inside the casing and projecting downwards from opposite ends thereof, the casing being provided with slots wherein the arms are guided and allowed to be deflected in planes parallel to the wheel, brushes connected to the free ends of the arms so as to be maintained by the latter at the side of the wheel ring near the ground, a link connecting the two arms so as to impart rocking motion from one to another on contact with obstructions, and springs maintaining the arms normally in their forward end position.

2. A structure as claimed in claim 1 wherein the brushes consist of kidney-shaped plates and bristles arranged radially about the edges of said plates.

3. The structure claimed in claim 1 in combination with brushes arranged in the slots in the casing so as to bear against the arms and form a closure round the latter.

4. The structure claimed in claim 1 in combination with plates suspended from horizontal hinges on the outside of the brushes and formed with gills adapted to raise the plates about the hinges when passing through water.

ARNO SCHNEIDER.